United States Patent
Ueyama et al.

(10) Patent No.: US 6,833,529 B2
(45) Date of Patent: Dec. 21, 2004

(54) POWER SUPPLY FOR SHORT-CIRCUITING ARC WELDING, AND AUTOMATIC WELDING MACHINE UTILIZING THE SAME

(75) Inventors: Tomoyuki Ueyama, Osaka (JP); Toshiro Uezono, Osaka (JP); Keiki Morimoto, Osaka (JP)

(73) Assignee: Daihen Corporation, Osaka (JP)

( * ) Notice: Subject to any disclaimer, the term of this patent is extended or adjusted under 35 U.S.C. 154(b) by 0 days.

(21) Appl. No.: 10/654,074

(22) Filed: Sep. 3, 2003

(65) Prior Publication Data

US 2004/0060913 A1 Apr. 1, 2004

(30) Foreign Application Priority Data

Sep. 26, 2002 (JP) ....................................... 2002-280132

(51) Int. Cl.⁷ ................................................. B23K 9/09
(52) U.S. Cl. ............................. 219/130.21; 219/130.51
(58) Field of Search ....................... 219/130.51, 130.21, 219/130.31, 130.32, 130.33

(56) References Cited

U.S. PATENT DOCUMENTS 4,546,234 A    10/1985  Ogasawara et al.
4,553,018 A *  11/1985  Kondo et al. .......... 219/130.51
4,877,941 A *  10/1989  Honma et al. ......... 219/130.21
6,207,927 B1    3/2001  Mita et al.
6,215,100 B1 *  4/2001  Stava .................... 219/130.51
6,498,321 B1 * 12/2002  Fulmer et al. ......... 219/130.33

FOREIGN PATENT DOCUMENTS

JP      4-4074      1/1992
JP      11-226730   8/1999

* cited by examiner

*Primary Examiner*—Clifford C. Shaw
(74) *Attorney, Agent, or Firm*—Merchant & Gould P.C.

(57) ABSTRACT

A power supply for arc welding includes switching elements PTR, NTR for switching the polarity of the direct voltage from a power circuit PMC. The element PTR is connected in parallel to a series unit of a switching element TR1 and a resistor R1. Likewise, the element NTR is connected in parallel to a series unit of a switching element R2 and a resistor R2. A necking determination circuit ND determines whether a constriction occurs at the molten bridging portion between the welding wire and the base material. When the constriction occurs during the "electrode positive" mode, the switching element PTR is turned off, while the switching element TR1 is brought into the conduction state. When the constriction occurs during the "electrode negative" mode, the switching element NTR is turned off, while the switching element TR2 is brought into the conduction state.

2 Claims, 7 Drawing Sheets

Burn through hole

Bead

Gap

FIG. 6B

Burn through hole

Gap

FIG. 7

POWER SUPPLY FOR SHORT-CIRCUITING ARC WELDING, AND AUTOMATIC WELDING MACHINE UTILIZING THE SAME

BACKGROUND OF THE INVENTION

1. Field of the Invention

The present invention relates to a power supply used for performing short-circuiting arc welding. The present invention also relates to an automatic welding machine or welder utilizing such a power supply. The power supply of the present invention is designed to perform "necking current control" and "electrode polarity switching control", as will be discussed later.

2. Description of the Related Art

As known in the art, arc welding is widely employed in the metalworking industries for joining two or more metallic parts. Taking the automotive industry for example, an assembly of metallic pieces are welded together for constructing e.g. a framework of a car seat. The welded framework may have a number of coalesced joints each having a welding length of no greater than 50 mm. Typically, such a framework is constructed from pipes, reinforcing plates, etc., that may be connected together by automatic $CO_2$-arc welding. The thickness of materials (pipes, reinforcing plates, etc.) used for making the framework may vary from 0.7 mm to 2.0 mm. For reliable connection, the welds (that is, the coalesced joints) of the framework need to have a sufficient depth of fusion. It is also required that spatters generated during the arc welding operation will not stick to the obtained weldment. Generally, $CO_2$-arc welding is a short-circuiting arc welding, and spatters tend to be generated when the short-circuiting occurs and breaks. In particular, when the short-circuiting breaks, a relatively great amount of spatters tend to be generated.

Figure 5:
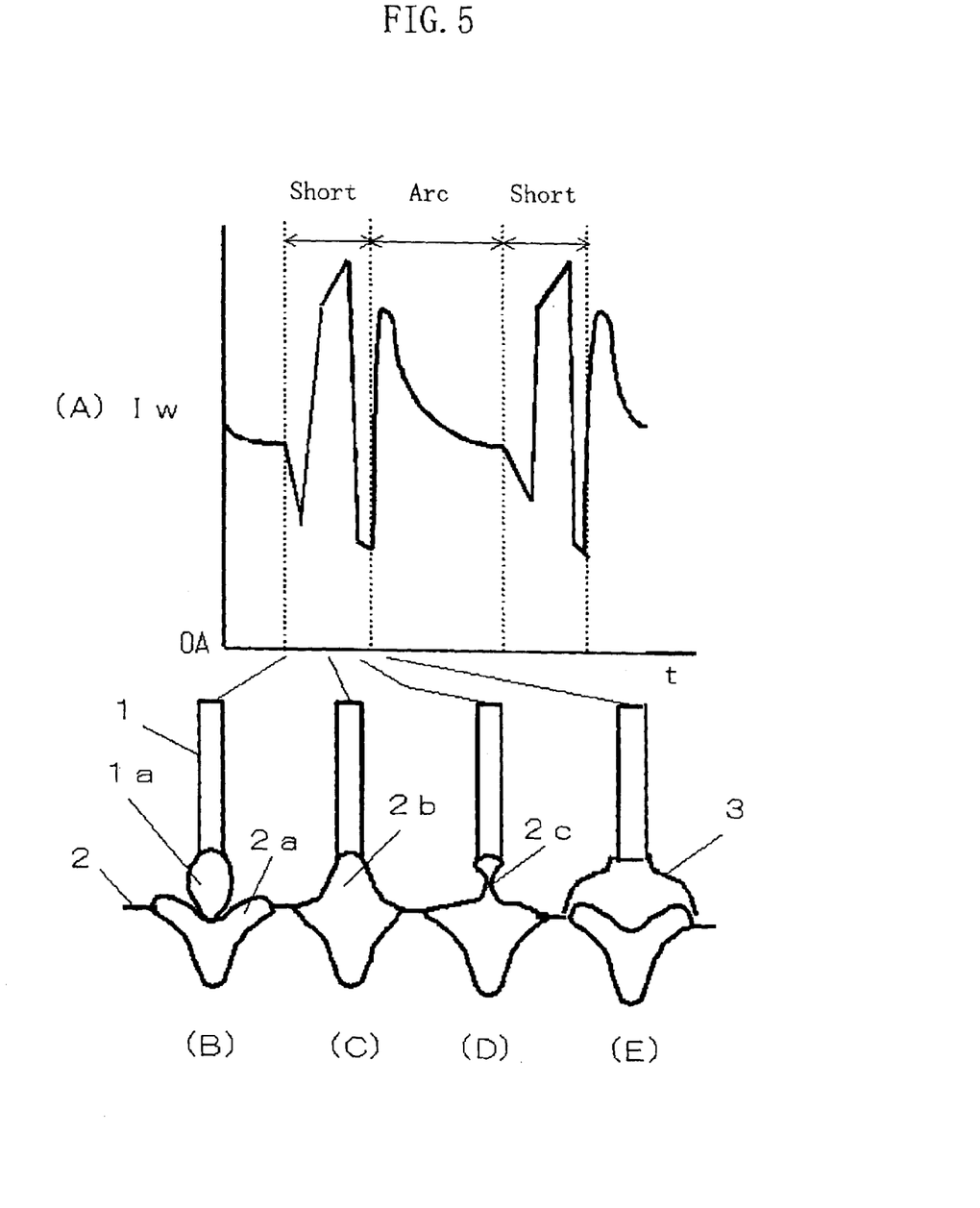
FIG. 5 illustrates the waveform of a welding current Iw employed for a conventional arc welding power supply and how a molten globule transfers from a welding wire to a base material.

JP-B2-Heisei 4-4074 discloses a technique for preventing the occurrence of spatters. In accordance with the conventional method, a welding wire (consumable electrode) is positively charged ("electrode positive" mode) for performing short-circuiting arc welding, and the welding current Iw is controlled for the purpose of reducing spatters. FIG. 5 shows the waveform of the welding current Iw (Graph A), and illustrates how a molten globule 1a transfers from the welding wire 1 to the base material 2 (Phases B~E).

As seen from FIG. 5, the short-circuiting between the welding wire 1 and the base material 2 occurs when the globule 1a formed on the welding wire 1 comes into contact with the molten pool 2a of the base material 2 (see Phase B) At this instant, the welding current Iw is decreased to reduce spatter generation.

Then, the welding current Iw is increased to exert a stronger electromagnetic pinching force on the molten bridging portion 2b (see Phase C). This promotes the globule transfer from the wire 1 to the base material 2.

Due to the increased pinching force, the molten bridging portion 2b is transformed into a constriction 2c (see Phase D). When the constriction 2c is detected, the welding current Iw is dropped off immediately before the regeneration of arc. This current-dropping process, called "necking current control", can significantly reduce the amount of spatters to be generated at the reoccurrence of arc. For achieving the current-dropping, the DC output of the power supply is connected to a switching element, with a resistor connected to the switching element in parallel. When no constriction is detected, the switching element is held in the conduction state to short-circuit the accompanying resistor. Upon detection of the constriction, the switching element is turned off so that the DC power supply will be inputted to the resistor. Thus, the welding current Iw can be decreased rapidly.

When the constriction 2c is formed, the resistance of the molten bridging portion 2b increases. This resistance rise is reflected in the rate of the welding voltage (dv/dt) and the rate of the welding current (dR/dt). Thus, the above-mentioned detection of the constriction 2c can be performed by monitoring the rate dv/dt or dR/dt.

After Phase D in FIG. 5, the regeneration of arc 3 occurs (see Phase E). To maintain the arc 3, the welding current Iw is increased.

During the short-circuiting period, the welding current Iw needs to be controlled precisely. Thus, the external characteristic of the power supply should be constant current characteristic. During the arc-generating period, on the other hand, the power supply is caused to have constant potential characteristic so that the arc has a proper length.

Figure 6A:
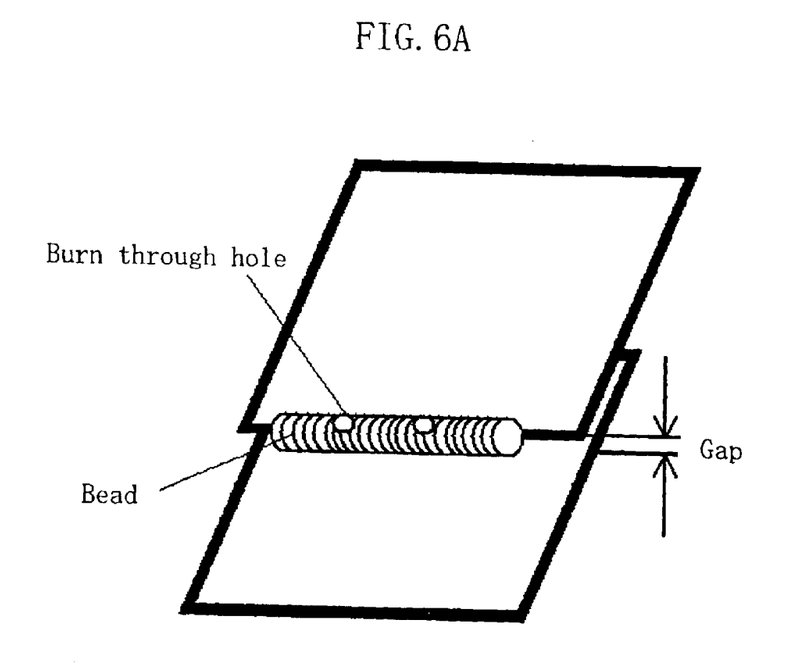
FIGS. 6A and 6B illustrate welding defects produced by conventional arc welding.
Figure 6B:
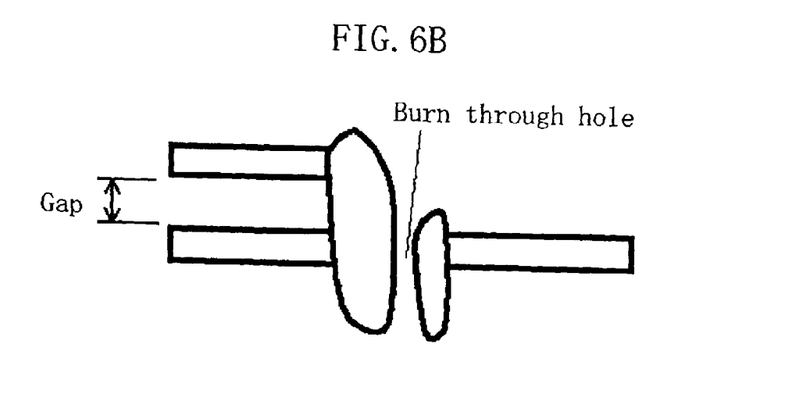

While the above-described prior art technique contributes to the reduction of spatters, it still may suffer a drawback illustrated in FIGS. 6A and 6B. Specifically, in these figures, two metal plates are about to be welded together. Each of the plates has a relatively small thickness (below 1 mm, for example). Further, some unavoidable gap is present between the upper and lower plates. When the prior art welding is performed with the thin plates, the lower plate may be formed with burn through holes due to an excessive amount of heat input.

Figure 7:
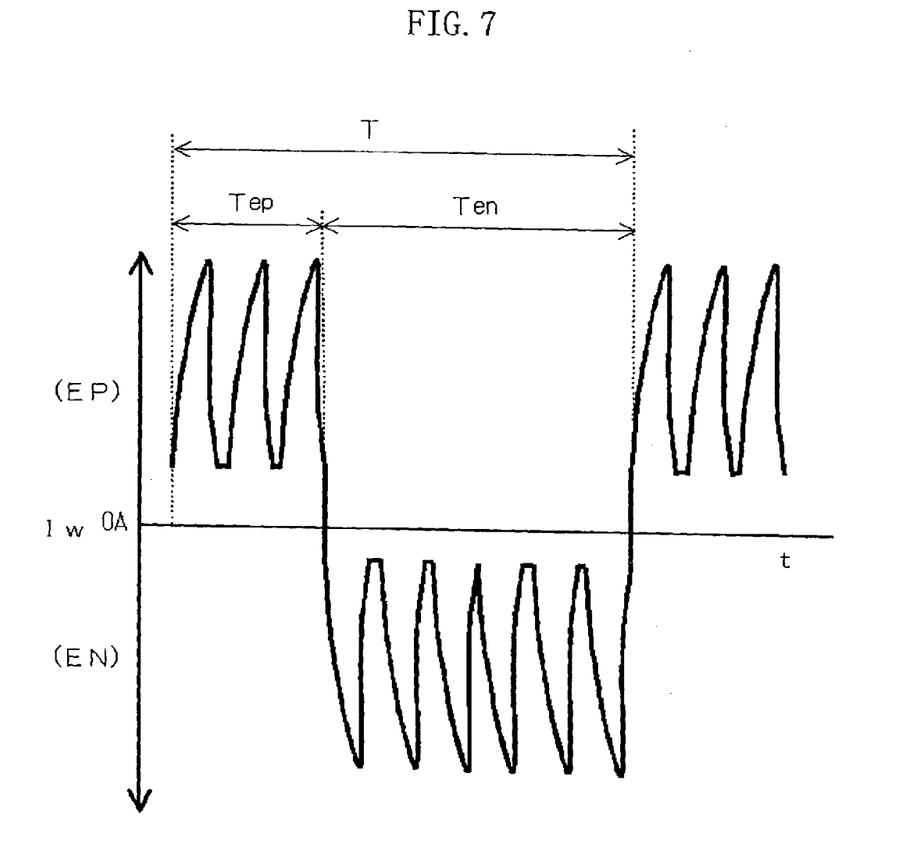
FIG. 7 shows a waveform of a welding current Iw employed for another conventional arc welding power supply.

Reference is now made to FIG. 7 showing the waveform of a conventional welding current Iw (see JP-A-Heisei 11-226730, for example). The welding current Iw for the Tep period is supplied in the state of the "electrode positive", while the current Iw for the Ten period is supplied in the state of the "electrode negative." In accordance with this prior art, it is possible to achieve a shallow depth of fusion by appropriately setting the cycle T (=Tep+Ten) and polarity rate Tep/(Tep+Ten) of the alternating welding current Iw. Accordingly, the "burn through hole" problem illustrated in FIGS. 6A–6B can be avoided. However, this alternative prior art method tends to produce a great amount of spatters at the time of the occurrence and breakage of the short-circuiting between the welding wire and the base material.

SUMMARY OF THE INVENTION

The present invention has been proposed under the circumstances described above. It is, therefore, an object of the present invention to provide a power supply for performing spatterless short-circuiting arc welding without causing burn through holes to be made even in a relatively thin base material.

According to a first aspect of the present invention, there is provided a power supply for short-circuiting arc welding. The power supply comprises: a primary power circuit for output of direct voltage; a primary controller for controlling the output from the primary power circuit and feeding of a welding wire; a polarity switching circuit including both an electrode positive switching element and an electrode negative switching element for selectively supplying an arc load with either one of electrode positive and electrode negative voltages based on the direct voltage from the primary power circuit; a first unit including a first switching element and a first resistor connected to the first switching element in series, the first unit being connected in parallel to the electrode positive switching element; a second unit including a second switching element and a second resistor connected to the second switching element in series, the second unit being connected in parallel to the electrode negative switching element; a necking determination circuit for outputting a necking determination signal by determining, based on at least either one of a welding voltage variation and a welding current variation, whether a constriction occurs in a molten bridging portion extending between the welding wire and a base material; a driving circuit for bringing the electrode positive switching element into a conduction state only when an electrode positive polarity setting signal is inputted from outside the power supply and no necking determination signal is outputted; a driving circuit for bringing the electrode negative switching element into a conduction state only when an electrode negative polarity setting signal is inputted from outside the power supply and no necking determination signal is outputted; a driving circuit for bringing said first switching element into a conduction state for rapidly decreasing the welding current only when the electrode positive polarity setting signal is supplied and the necking determination signal is outputted; and a driving circuit for bringing said second switching element into a conduction state for rapidly decreasing the welding current only when the electrode negative polarity setting signal is supplied and the necking determination signal is outputted.

According to a second aspect of the present invention, there is provided an automatic welding machine incorporating the above-described power supply. The welding machine further comprises a welding robot; and a robot controller. The robot controller controls the movement of the welding robot and also sends welding condition setting signals to the power supply. The welding condition setting signals may include a polarity setting signal suitable for a welding area of the base material.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

Figure 1:
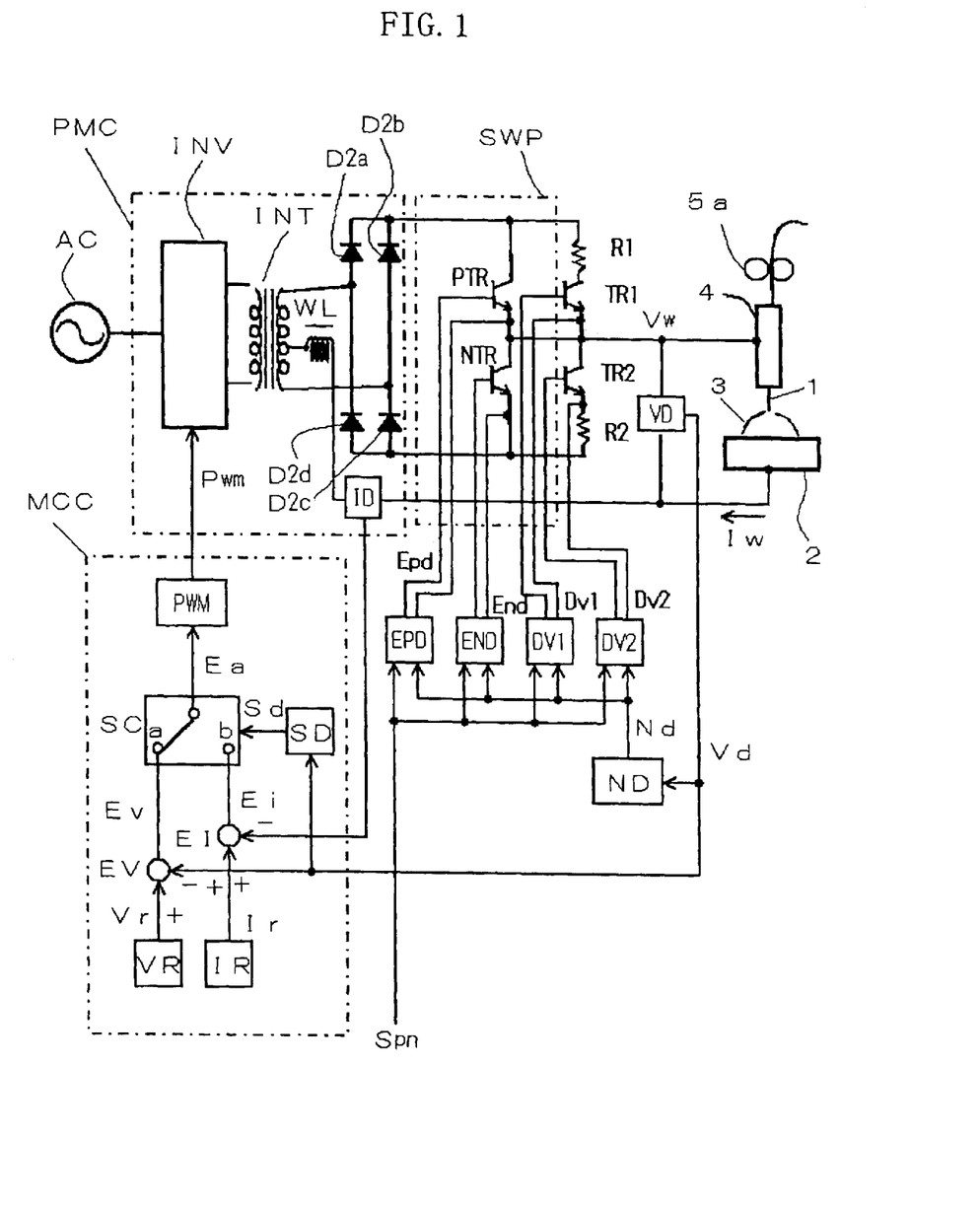
FIG. 1 is a block diagram illustrating a power supply for short-circuiting arc welding according to a first embodiment of the present invention.

FIG. 1 is a block diagram showing an arc welding power supply according to a first embodiment of the present invention. The illustrated power supply comprises the following features.

A primary power circuit PMC converts an input alternating voltage to an output direct voltage. The input may be a commercially available three-phase voltage of 200V, for example. The primary power circuit PMC includes an inverter INV (incorporating an unillustrated rectifier for the input voltage), a high-frequency transformer INT, secondary rectifiers D2a~D2d, and a reactor WL. Specifically, the inverter INV changes the rectified input voltage to a high-frequency alternating voltage. The transformer INT steps down this high-frequency voltage to a lower voltage suitable for performing the required welding operation. The secondary rectifiers D2a~D2d rectify the reduced alternating voltage, to output positive and negative DC voltages. The reactor WL smoothes the outputted DC voltages.

The above positive and negative DC voltages are applied selectively to the load (i.e., the arc 3) through a polarity switching circuit SWP. To achieve this selection, the switching circuit SWP includes an "electrode positive" switching element PTR and an "electrode negative" switching element NTR. When the "electrode positive" switching element PTR is in a conductive state, the positive voltage is applied to the wire 1. On the other hand, when the "electrode negative" switching element NTR is in a conductive state, the negative voltage is applied to the wire 1.

The "electrode positive" switching element PTR is connected in parallel to a combination of a switching element TR1 and a resistor R1 (connected to the switching element TR1 in series). Likewise, the "electrode negative" switching element NTR is connected in parallel to a combination of a switching element TR2 and a resistor R2 (connected to the switching element TR2 in series).

The welding wire 1 extends through a welding torch 4. For supplement of the consumed portion, the welding wire 1 is fed forward through the torch 4 by the rotation of feeding rollers 5a. Arcs 3 are generated between the welding wire 1 and the base material 2 in accordance with the welding voltage Vw and the welding current Iw.

A voltage detector VD detects the welding voltage Vw to output a voltage detection signal Vd corresponding to the absolute value of the detected voltage Vw. A necking determiner ND determines whether a constriction occurs in the molten bridging portion extending between the welding wire 1 and the base material 2. For this determination, the necking determiner ND monitors the rate of the voltage detection signal Vd (i.e., dVd/dt). When a constriction occurs, the necking determiner ND outputs a necking determination signal Nd. The occurrence of a constriction is a sign that the current short-circuiting state between the wire 1 and the base material 2 will transfer soon to an arc-generating state.

A driving circuit EPD outputs a driving signal Epd to control the conduction/non-conduction state of the "electrode positive" switching element PTR. In accordance with the driving signal Epd, the switching element PTR is brought into the conduction state only when the polarity setting signal Spn (supplied from outside the power unit) is at a prescribed "high" level and the necking determination signal Nd is not outputted (the low level of the signal Nd). Likewise, a driving circuit END outputs a driving signal End to control the conduction/non-conduction state of the "electrode negative" switching element NTR. In accordance with the driving signal End, the switching element NTR is brought into the conduction state only when the polarity setting signal Spn is at a prescribed "low" level (as compared to the above-mentioned "high" level of the signal Spn) and the necking determination signal Nd is not outputted.

A driving circuit DV1 outputs a driving signal Dv1 to control the conduction/non-conduction state of the switching element TR1. In accordance with the driving signal Dv1, the switching element TR1 is brought into the conduction state only when the polarity setting signal Spn is at the high level and the necking determination signal Nd is outputted. Likewise, a driving circuit DV2 outputs a driving signal Dv2 to control the conduction/non-conduction state of the switching element TR2. In accordance with the driving signal Dv2, the driving circuit DV2 is brought into the conduction state only when the polarity setting signal Spn is at the low level and the necking determination signal Nd is outputted.

With the above arrangement, when the polarity setting signal Spn is at the high level and no necking determination signal Nd is outputted (the "electrode positive" case), the "electrode positive" switching element PTR is in the conduction state, and the welding current Iw passes through the switching element PTR, the welding wire 1, the base material 2 and the reactor WL in this order. Then, when the necking determination signal Nd is outputted, the inverter is turned off to stop the output from the primary power circuit PMC. At the same time, the switching element PTR is brought into the non-conduction state, while the switching element TR1 is brought into the conduction state. As a result, the energy stored in the reactor WL is discharged along the path via the resistor R1, the switching element TR1, the welding wire 1, the base material 2 and the reactor WL. The discharge rate is proportional to L/R, where L is the inductance [H] of the reactor WL and R is the resistance [•] of the resistor R1. Without the resistor R1, the internal resistance of the power supply of FIG. 1 is in the range of 0.01~0.05•. With the resistor R1 (R=0.5•) put in the circuit, as shown in FIG. 1, the discharge rate (in other words, the current dropping rate) becomes faster about tenfold or more.

As readily understood, the same current dropping operation as described above can be performed in the "electrode negative" case, too. Specifically, with the polarity setting signal Spn being at the low level (i.e., the "electrode negative" mode), the necking determination signal Nd is changed from the low level (no output level) to the high level (output level). As a result, the inverter is turned off, the switching element NTR is brought into the non-conduction state, and the switching element TR2 is brought into the conduction state.

A current detector ID detects the welding current Iw to output a current detection signal Id that corresponds to the absolute value of the detected welding current Iw. A primary controller MCC controls the output of the primary power circuit PMC and the wire feeding operation for supplement of the welding wire 1. The primary controller comprises the following features.

A short-circuiting determination circuit SD outputs a short-circuiting determination signal Sd based on the voltage detection signal Vd. A voltage setting circuit VR outputs a voltage setting signal Vr for performing the desired voltage setting. A current setting circuit IR outputs a current setting signal Ir for setting the welding current Iw during the short-circuiting period. A voltage error amplifier EV amplifies the difference between the voltage setting signal Vr and the voltage detection signal Vd, to output a voltage error amplification signal Ev. A current error amplifier EI amplifies the difference between the current setting signal Ir and the current detection signal Id, to output a current error amplification signal Ei. An external characteristic switching circuit SC switches to the a-side (see FIG. 1) when the short-circuiting determination signal Sd is at a low level (the arc-generating period). At this time, the above-mentioned voltage error amplification signal Ev is outputted from the switching circuit SC as an error amplification signal Ea. When the short-circuiting determination signal Sd is at a high level (the short-circuiting period), on the other hand, the external characteristic switching circuit SC switches to the b-side, thereby outputting the current error amplification signal Ei as an error amplification signal Ea. With this arrangement, the power supply is brought into the "constant potential characteristic" mode when in the arc-generating period, or into the "constant current characteristic" mode when in the short-circuiting period. Based on the error amplification signal Ea, a pulse-width modulation control circuit PWM outputs a control signal Pwm for performing PWM control with respect to the inverter INV.

Figure 2:
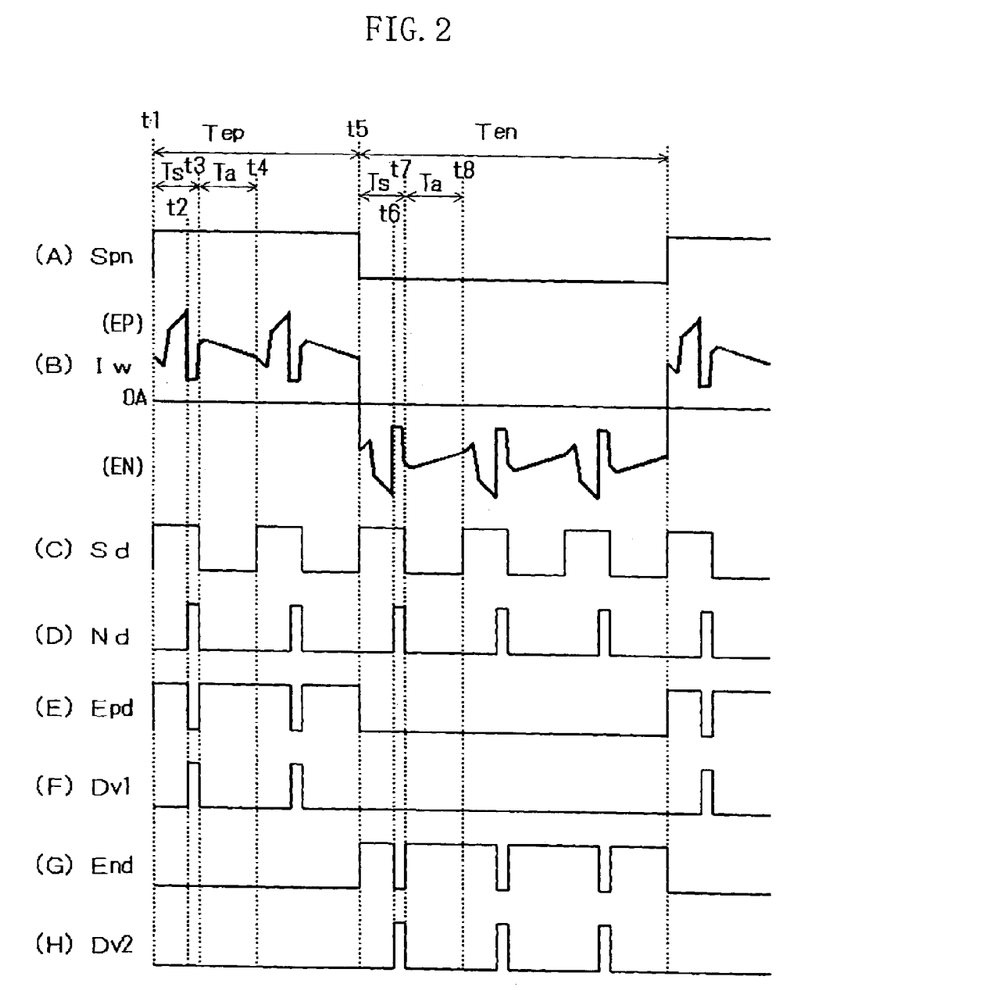
FIG. 2 is a timing chart for illustrating signals used for the power supply of FIG. 1.

Reference is now made to FIG. 2 showing a timing chart for the above-described signals Spn, Iw, Sd, Nd, Epd, Dv1, End, Dv2 (A~H) of the power supply of the present invention. The timing chart is generally divided into two periods: the "electrode positive" period Tep and the "electrode negative" period Ten.

(1) Electrode Positive Period Tep—Polarity Setting Signal Spn (A) at High Level

The short-circuiting determination signal Sd (C) is at the high level during the short-circuiting period Ts (t1~t3), and at the low level during the arc-generating period Ta (t3~t4). The necking determination signal Nd (D) is at the high level for t2~t3 when the necking occurs. The driving signal Epd (E) for the "electrode positive" switching element PTR is at the high level when the necking determination signal Nd is at the low level (t1~t2, t3~t4). At this time, the switching element PTR is held in the conduction state. The driving signal Dv1 (F) for the switching element TR1 is at the high level when the necking determination signal Nd is at the high level (t2~t3). At this time, the switching element TR1 is held in the conduction state.

(2) Electrode Negative Period Ten—Polarity Setting Signal Spn (A) at Low Level

The short-circuiting determination signal Sd (C) is at the high level when the short-circuiting period Ts (t5~t7), and at the low level when the arc-generating period Ta (t7~t8). The necking determination signal Nd (D) is at the high level for t6~t7 when the necking occurs. The driving signal End (G) for the "electrode negative" switching element NTR is at the high level when the necking determination signal Nd is at the low level (t5~t6, t7~t8). At this time, the switching element NTR is held in the conduction state. The driving signal Dv2 (H) for the switching element TR2 is at the high level when the necking determination signal Nd is at the high level (t6~t7). At this time, the switching element TR2 is held in the conduction state.

With the use of the above-described power supply for a short-circuiting arc welding machine, it is possible to perform proper welding operation with respect to a very thin material (having a thickness of no greater than 1 mm, for example), as opposed to the conventional power supply. Specifically, to weld together thin metallic materials (plates, pipes, etc.), the polarity setting signal Spn is set to the low level, so that the welding operation is performed in the "electrode negative" mode. In this manner, the weld heat input to the base material can be reduced sufficiently to prevent defects (such as burn through holes) from occurring in the base material. Further, the necking current control in the "electrode negative" mode contributes to low-spatter welding. With respect to a relatively thick material (having a thickness of more than 1 mm, for example), the polarity setting signal Spn is set to the high level, so that the welding operation is performed in the "electrode positive" mode. In this manner, it is possible to ensure a sufficiently great dept of fusion in the base material. Again, the accompanying necking current control contributes to performing low-spatter welding.

Figure 3:
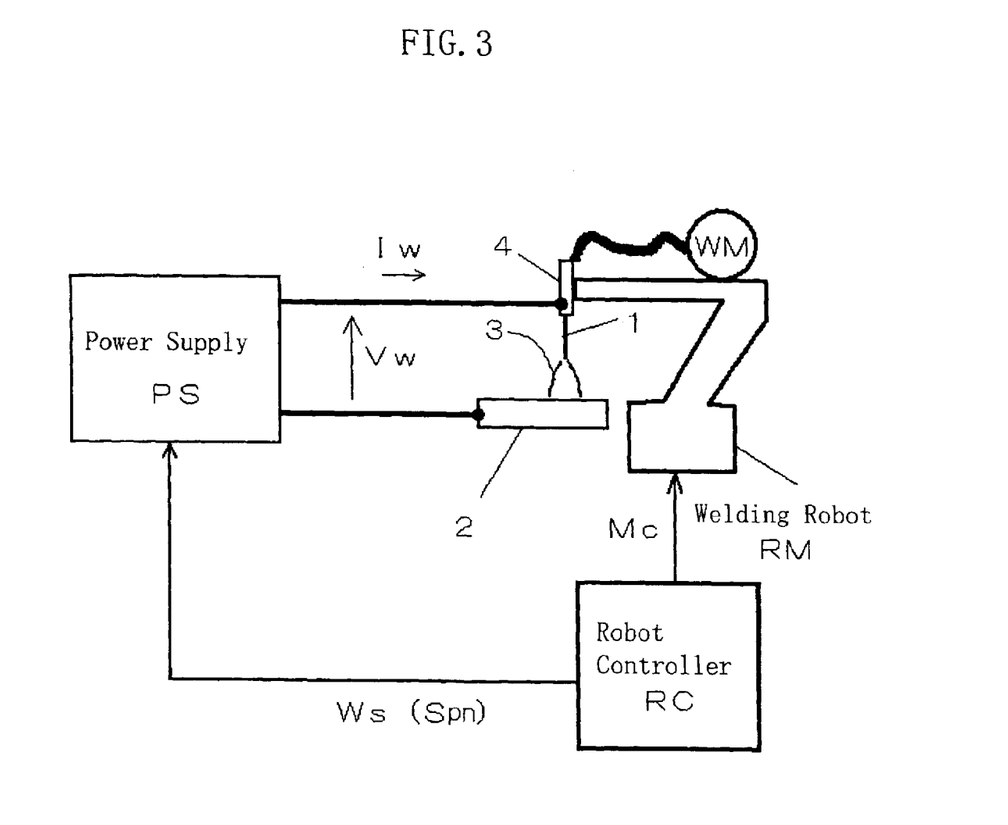
FIG. 3 schematically shows an automatic welding machine according to a second embodiment of the present invention.

FIG. 3 schematically shows an automatic welding machine according to a second embodiment of the present invention. The welding machine includes a power supply PS according to the above-described first embodiment, and a robot controller RC for controlling the operation of a welding robot RM.

For causing the welding robot RM to work in accordance with work programs, the robot controller RC sends operation control signals Mc to the servo motors (not shown) incorporated in the welding robot RM. Further, the robot controller RC sends welding condition setting signals Ws to the power supply PS. The welding condition setting signals Ws may include an output start signal, a voltage setting signal, a feeding rate setting signal, and a polarity setting signal Spn described above regarding the first embodiment of the present invention. The supplement oaf the welding wire 1 through the torch 4 is performed by a wire feeding motor WM mounted on the welding robot RM. The polarity of the welding voltage Vw is switchable in accordance with the polarity setting signal Spn.

Figure 4:
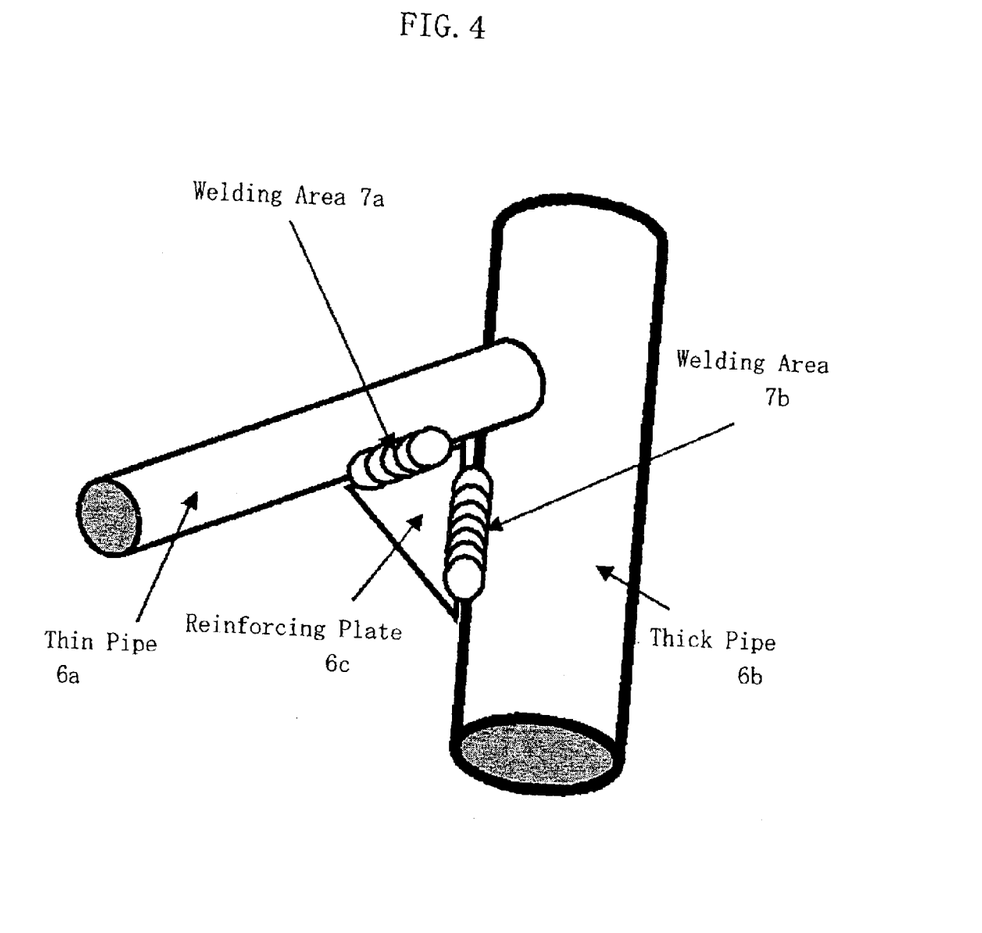
FIG. 4 shows an example of weldment composed of a reinforcing plate welded to a thin-walled pipe and to a thick-walled pipe.

FIG. 4 shows an example of weldment assembled by the automatic welding machine of FIG. 3. In the figure, the sign 6a refers to a thin-walled pipe having a thickness of 0.8 mm, the sign 6b to a thick-walled pipe having a thickness of 1.6 mm, and the sign 6c to a reinforcing plate. In light of the small thickness (no greater than 1 mm), the thin-walled pipe 6a is welded to the reinforcing plate 6c (see the weld area 7a) in the "electrode negative" mode (the polarity setting signal Spn at the low level). On the other hand, due to the relatively great thickness, the other pipe 6b is welded to the reinforcing plate 6c (see the weld area 7b) in the "electrode positive" mode (the polarity setting signal Spn at the high level). Together with the "electrode negative" or "electrode positive" welding operation, the necking current control is also performed to reduce spatters. Thus, with the use of the welding machine of the present invention, the welding result is spatterless and suffers no burn through holes.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A power supply for short-circuiting arc welding, the power supply comprising:

a primary power circuit for output of direct voltage;

a primary controller for controlling the output from the primary power circuit and feeding of a welding wire;

a polarity switching circuit including both an electrode positive switching element and an electrode negative switching element for selectively supplying an arc load with either one of electrode positive and electrode negative voltages based on the direct voltage from the primary power circuit;

a first unit including a first switching element and a first resistor connected to the first switching element in series, the first unit being connected in parallel to the electrode positive switching element;

a second unit including a second switching element and a second resistor connected to the second switching element in series, the second unit being connected in parallel to the electrode negative switching element;

a necking determination circuit for outputting a necking determination signal by determining, based on at least either one of a welding voltage variation and a welding current variation, whether a constriction occurs in a molten bridging portion extending between the welding wire and a base material;

a driving circuit for bringing the electrode positive switching element into a conduction state only when an electrode positive polarity setting signal is inputted from outside the power supply and no necking determination signal is outputted;

a driving circuit for bringing the electrode negative switching element into a conduction state only when an electrode negative polarity setting signal is inputted from outside the power supply and no necking determination signal is outputted;

a driving circuit for bringing said first switching element into a conduction state for rapidly decreasing the welding current only when the electrode positive polarity setting signal is supplied and the necking determination signal is outputted; and a driving circuit for bringing said second switching element into a conduction state for rapidly decreasing the welding current only when the electrode negative polarity setting signal is supplied and the necking determination signal is outputted.

2. An automatic welding machine comprising:

a power supply according to claim 1;

a welding robot; and a robot controller;

wherein the robot controller controls movement of the welding robot and sends welding condition setting signals to the power supply, the welding condition setting signals including a polarity setting signal suitable for a welding area of the base material.

* * * * *